United States Patent [19]
Cornish et al.

[11] 3,909,920
[45] Oct. 7, 1975

[54] METHOD OF RETAINING AN INNER PART WITHIN THE BORE OF AN OUTER PART

[75] Inventors: Robert F. Cornish, North Canton; Daniel E. Popa, Massillon, both of Ohio

[73] Assignee: The Timken Company, Canton, Ohio

[22] Filed: Mar. 18, 1974

[21] Appl. No.: 451,834

[52] U.S. Cl. .................... 29/522; 29/526; 285/276; 403/326
[51] Int. Cl.² .................... B21D 39/00; B23P 11/02
[58] Field of Search ............... 29/149.5 R, 522, 526; 285/276, 321; 287/DIG. 7; 403/326

[56] References Cited
UNITED STATES PATENTS

| | | | |
|---|---|---|---|
| 1,917,987 | 7/1933 | Large | 308/187.2 |
| 1,917,988 | 7/1933 | Large | 308/187.2 |
| 2,136,155 | 11/1938 | Spicacci | 403/326 X |
| 2,258,395 | 10/1941 | Tome | 29/526 X |
| 2,595,787 | 5/1952 | Heimann | 285/321 X |
| 2,836,445 | 5/1958 | Baudry | 285/321 X |
| 2,886,355 | 5/1959 | Wurzel | 403/326 |
| 3,071,398 | 1/1963 | Henning | 285/321 X |
| 3,158,931 | 12/1964 | Shutt et al. | 29/522 |
| 3,408,095 | 10/1968 | Moore | 285/276 X |

Primary Examiner—Lowell A. Larson
Assistant Examiner—D. C. Reiley, III
Attorney, Agent, or Firm—Gravely, Lieder & Woodruff

[57] ABSTRACT

An assembly of at least two parts, one of which is received in the other, held together by a clamping ring which bears against an end surface on one of the parts and is deformed into a groove in the other part. The clamping ring has an oblique lip which is deformed by applying an axially directed force to it while at the same time preventing the free end of the lip from moving radially away from the groove. The process is ideally suited for assembly operations where relatively large tolerances are permitted in the axial dimensions of the parts. It is also suited for retaining a plurality of inner parts in a housing bore where tolerance accumulation is a problem, such as in unitized tapered roller bearings.

17 Claims, 14 Drawing Figures

METHOD OF RETAINING AN INNER PART WITHIN THE BORE OF AN OUTER PART

BACKGROUND OF THE INVENTION

This invention relates in general to retaining one part in another part and more particularly to a method of securing an inner part to an outer part and a bearing arrangement secured thereby.

In many assembly operations it is necessary to secure a cylindrical part within a bore of another part such that no axial end play exists between the two parts. For example, in bearing arrangements, the outer race of the bearing is normally fitted into a bore in a housing and secured such that the race will not move relative to the housing. One method of securing the inner part is to overside it slightly with respect to the bore in the other part and then force it into the bore. The friction between the bore and the inner part holds the inner part in place, but friction fits do not provide positive retention and require close radial tolerances. Nuts, bolts, or set screws may be used to eliminate axial tolerances but they require expensive machining operations and normally increase the size of the overall assembly. A snap ring fitted into a groove in the outer part provides positive retention and when tapered will compensate for some axial tolerances, but such tolerances are usually quite small. The cost of locating and machining the groove for a snap ring is quite high. Also, the cost of a tapered snap ring is high because of the close axial and taper tolerances required.

Accommodating width tolerances presents a major problem in mountings of unitized tapered roller bearings in housing bores. This type of bearing has a single row of tapered rollers which roll along tapered raceways of a cup and cone. The bearing not only carries radial loading, but also takes thrust loading in both axial directions. In one direction the thrust load is transmitted generally transversely through the rollers from one tapered raceway to the other. In the other direction the thrust load is transmitted generally longitudinally through the rollers between thrust ribs at the ends of the bearing. The thrust rib at the large diameter ends of the rollers in the completed bearing is normally fixed in position with respect to the cup, but initially is detached from the cup to facilitate assembly of the bearing. Hence, the cup thrust rib must be clamped tightly against the cup front face, and any device for clamping the cup and its thrust rib together in a housing bore must be able to accommodate variances in the clamping width.

SUMMARY OF THE INVENTION

One of the principal objects of the present invention is to provide a method of positively securing an inner part to an outer part without holding tight manufacturing tolerances in the axial dimensions of the parts. Another object is to provide a method of the type stated which is quick and simple and is economical to use. A further object is to provide a method of the type stated which is ideally suited for clamping the cup and thrust rib of a unitized tapered roller bearing together and for retaining a unitized tapered roller bearing in a housing bore. An additional object is to provide a bearing arrangement which is mounted by the foregoing process. These and other objects and advantages will become apparent hereinafter.

The present invention is embodied in a process for securing two parts by a retaining element which bears against one of the parts and is deformed into a groove in the other part. The invention also resides in a bearing arrangement assembled with the foregoing process. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
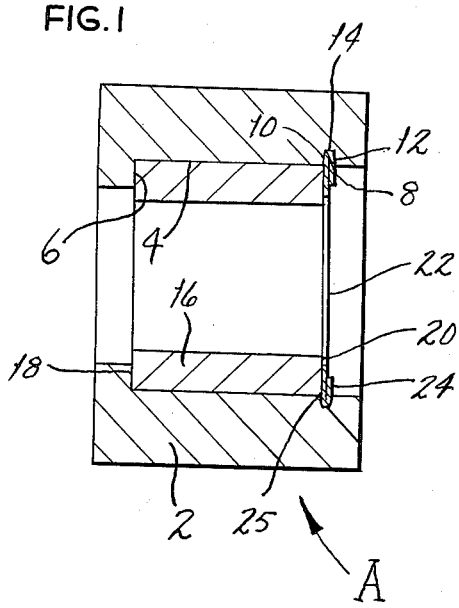
FIG. 1 is a sectional view in elevation of an assembly of inner and outer parts assembled by the process of the present invention.

Referring now to the drawings (FIG. 1) A designates an assembly of two or more parts which are assembled in accordance with the process of the present invention. In particular, the assembly A includes an outer part 2 having a bore 4 therein and a shoulder 6 at one end of the bore 4. The bore 4 extends to the other end of the part 2 where it opens out of the part 2. The outer part 2 also has a groove 8 which opens into the bore 4 and is spaced axially from the shoulder 6. The groove 8 is defined by an inboard surface 10, an outboard surface 12, and a back surface 14. The inboard surface 10 is inclined at an angle of about 5° (FIGS. 2A and B) with respect to the perpendicular to the axis of the bore 4, while the outboard surface 12 is inclined at about 10°. The depth of the groove 8 should be at least 0.040 inches and preferably less than 0.050 inches for a housing having a bore of 2.600 inches when using a clamping ring which is 0.032 inches thick.

Figure 2A:
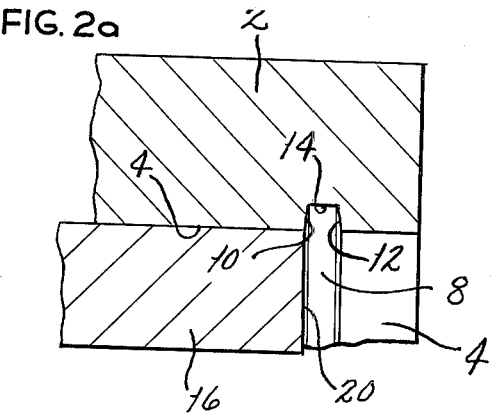
FIGS. 2A and 2B are fragmentary sectional views showing the relationship between the inner and outer parts at both extremes of the tolerance range.
Figure 2B:
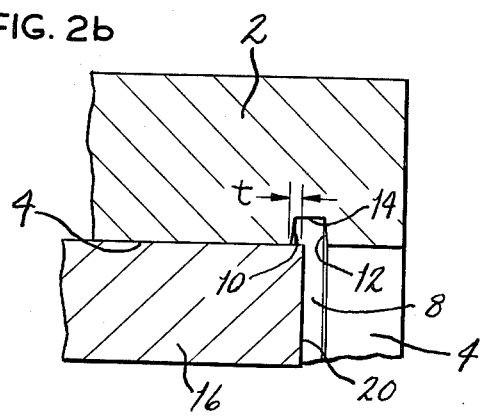

The bore 4 of the outer part 2 receives a cylindrical inner part 16 which fits into the bore 4 without excessive clearance in the radial direction. The inner part 16 has flat end faces 18 and 20, the former of which abuts the shoulder 6, while the latter is located at the groove 8. The shoulder 6 therefore constitutes a locating surface or limiting means for the inner part 16. The axial dimension of the inner part 16, that is the distance between the end faces 18 and 20 thereon, generally speaking should be such that the end face 20 is located no further inwardly than the line of intersection between the inboard surface 10 of the groove 8 and the surface of the bore 4 (FIG. 2A). Actually, the end face 20 may lie short of the groove 8 a short distance, for example 0.005 inches. The end face 20, however, may be located outwardly beyond the inboard surface 10 of the groove 8, in which case it will be located between the surfaces 10 and 12 of the groove 8 (FIG. 2B). The maximum distance which the end face 20 may be located beyond the inboard side face 10 of the groove 8 is the tolerance t (FIG. 2B) for the axial dimension of the inner part 16 and that distance should not be greater than 30 percent of the width of the groove at its intersection with the bore. In FIGS. 2A, 3A, 4A, 5A and 6A the part 16 is shown at its minimum allowable dimension in the axial direction, while in FIGS. 2B, 3B, 4B, 5B and 6B it is shown at its maximum allowable dimension. To simplify the discussion, it is assumed that the distance between the groove 8 and the shoulder 6 does not vary from one outer part 2 to another, or in other words this dimension has zero tolerance, but it will be recognized that the process will accommodate for tolerance in that dimension also The inner part 16 is retained in the outer part 2 by a retaining element or clamping ring 22 which bears against the end face 20 of the inner part 16 and has a lip 24 which is doubled back upon the main body of the ring 22 at a fold 25 where it projects into the groove 8 (FIG. 1). The lip 24 bears against the outboard side surface 12 of the groove 8 so that the ring 22 is in effect captured between the end face 20 of the inner part 16 and the outboard side surface 12 of the groove 8. Hence, the clamping ring 22 does not move axially, nor does the inner part 16. The doubled back lip 24 thus constitutes a locking portion on the ring 22, while the remainder of the ring 22 forms a blocking portion which blocks and prevents removal of the inner part 16. The clamping ring 22 is formed from soft steel sheet stock such as SAE 1008 to 1010 steel. The width of the groove 8, that is the axial distance between the inboard and outboard side surfaces at the surface of the bore 4, is between 0.005 inches and 0.015 inches wider than twice the thickness of the stock from which the clamping ring 22 is stamped. Preferably, the groove 8 is 0.006 inches wider than twice the thickness of the sheet stock. Clamping rings 22 formed from steel sheet stock having a thickness of 0.032 inches are suitable for the size range of unitized tapered roller bearings currently available. These bearings currently range in size from 2.28 inches O.D. to 3.15 inches. Any significant deviation from these diameters may require different stock thickness and groove proportions.

Figure 3A:
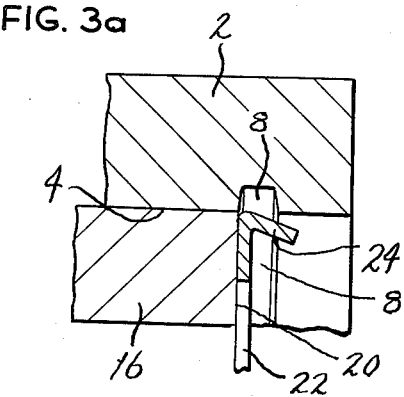
FIGS. 3A and 3B are fragmentary sectional views showing the initial step of assembling at both extremes of the tolerance range.

The lip 24 of the clamping ring 22 is deformed by cramming or stuffing it into the groove 8 during the assembly operation. Prior to the deformation, the ring 22 has a diameter which is slightly less than the diameter of the bore 4 so that the ring 22 can be inserted easily into the bore 4 and placed against the end face 20 of the inner part 16 (FIGS. 3A and B). Before being deformed the lip 24 is generally straight and is inclined at an angle of between 20° and 40° and preferably 30° with respect to the axis of the bore 4.

Figure 4A:
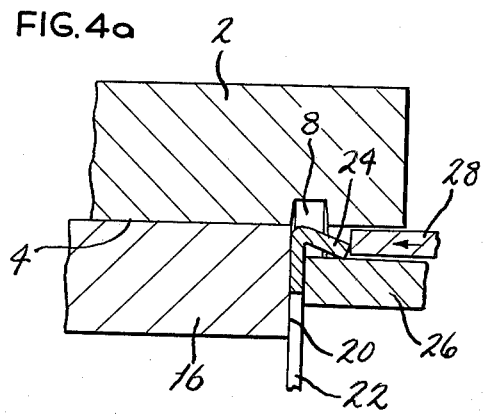
FIGS. 4A and 4B show a subsequent step of assembling wherein a compound punch is brought into position at both extremes of the tolerance range.
Figure 3B:
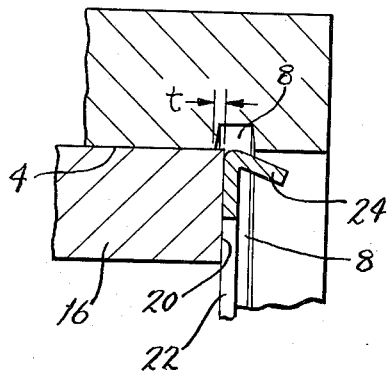
Figure 4B:
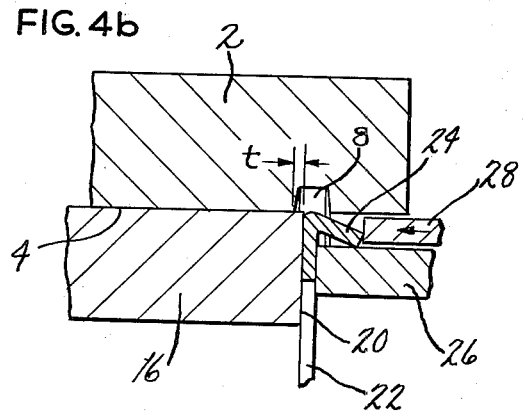

The deformation of the lip 24 on the ring 22 to effect its radical travel for cramming or stuffing into a groove or recess is accomplished with a compound punch set including an inner punch 26 and an outer punch 28 which surrounds the inner punch 26 and operates independently of it (FIGS. 4A and B). The outer part 2 is held in a suitable fixture (not shown) with its bore 4 opening toward and aligned with the punches 26 and 28. The inner punch 26 fits within the outer punch 28 and is further small enough to also fit into the doubled back lip 24 prior to deformation of that lip. However, the clearance between the undeformed lip 24 and the inner punch 26 is not very great. The inner punch 26 has a flat end face. The outer punch 28 possesses a tubular configuration which enables it to operate over the inner punch 26. When the inner punch 26 projects into the undeformed lip 24 of the clamping ring 22, the end face of the outer punch 28 will align with the free end of the lip 24. In this regard, the outer punch 28 has a flat end face and is sized to fit into the bore 4 of the outer part 2.

To assemble the assembly A, the outer part 2 is placed in the fixture (not shown) so that its bore 4 aligns with the punches 26 and 28. Next, inner part 16 is fitted into the bore 4 and allowed to come to rest against the shoulder 6 (FIG. 1). Because of the tolerance permitted in the axial dimension of the inner part 16, the end face 20 thereof will most likely be located between the inboard and outboard side surfaces 10 and 12 of the groove 8, but for all practical purpose it will never be located closer to the shoulder 6 than the inboard surface 10. Thereafter, the undeformed clamping ring 22 is installed in the bore 4 and allowed to come to rest against the end face 20 of the inner part 16 with the lip 24 projecting outwardly toward the open end of the bore 4 (FIGS. 3A and B).

Once the inner part 16 and the clamping ring 22 are properly installed in the bore 4 of the outer part 2, the inner punch 26 is moved into the bore 4 and forced tightly against the main body of the clamping ring 22, thus forcing the clamping ring 22 tightly against the end face 20 of the inner part 16 (FIGS. 4A and B). When the inner punch 26 is so disposed, it is projected through the doubled back lip 24 so that the inner margin of the lip 24 is located close to the circumferential surface of the punch 26.

Figure 5A:
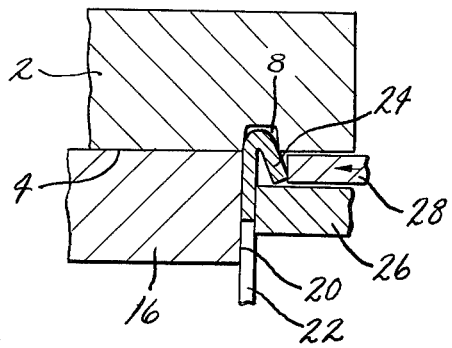
FIGS. 5A and 5B show the retaining element being deformed into a groove within the outer part by the compound punch at both extremes of the tolerance range.
Figure 6A:
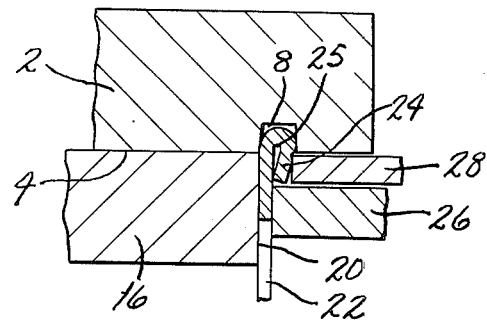
FIGS. 6A and 6B show the completion of the assembly procedure and the lip deformed into the groove at both extremes of the tolerance range.
Figure 5B:
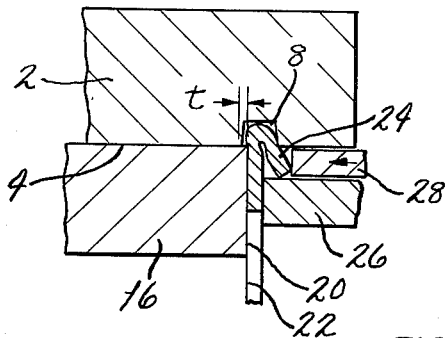
Figure 6B:
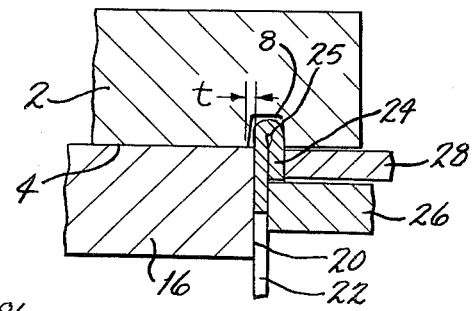

After the inner punch 26 is advanced to the position where it tightly clamps the clamping ring 22, the outer punch 28 is advanced over the inner punch 26 and into engagement with the free end of the undeformed lip 24. Further advancement causes the free end of the lip 24 to turn inwardly toward and move along the circumferential surface of the inner punch 26 (FIGS. 5A and B). Thus, the inner punch 26 serves as an anvil for preventing the free end of the lip 24 from moving radially inwardly as it is forced axially toward end face 20 of inner part 16. Since the lip 24 is prevented from moving radially inwardly, it deforms and is crammed or stuffed radially outwardly into the surrounding groove 8. Actually, the lip 24 during its entry into the groove 8 flows plastically both in the axial direction and the radial direction. The configuration that the lip 24 assumes in the groove 8 is dependent on the distance the inner part 16 projects beyond the inboard surface 10 of the groove 8. For example, when the inner part 16 is at its minimum permissible axial dimension, its end surface 20 will be exactly at the inboard side face 10 of the groove 8. In that case, the ring 22 is hollow at the fold 25 of the lip 24 (FIG. 6A). On the other hand, when the inner part 16 is at its maximum permissible axial dimension, the end face 20 thereon will be located beyond the side face 10 of the groove a distance equal to the tolerance $t$. In that case, the deformed lip 24 is nearly solid at the fold 25 (FIG. 6B). In any event, the deformed portion of the ring 22 does not contact the back surface 14 of the groove 8.

Once the outer punch 28 is advanced to its fullest extend (FIGS. 6A and B), both punches 26 and 28 are withdrawn and the assembly A is complete. The retention provided by the clamping ring 22 is so effective that the ring 22 will shear at its double thickness in the vicinity of the lip 24 rather than springing out of the groove 8. Moreover, the ring 22 is ideally suited for holding a plurality of inner parts in the bore instead of the single inner part 16. In that case tolerances permitted in the individual parts accumulate and create a large overall tolerance when the several inner parts are set end to end within the bore 4. The assembly method of the present invention accommodates this tolerance build-up.

Also, the process may be used to hold a wheel or similar device on a shaft. In that case, the groove 8 is formed in the shaft and the lip 24 is on the inner margin of the ring 22, not the outer margin. Also, the outer punch would clamp the ring tightly in place while the inner punch would actually deform the lip 24 inwardly.

Figure 7:
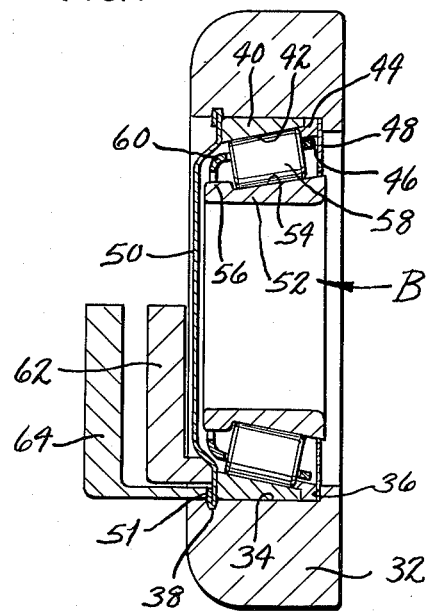
FIG. 7 is a sectional view of a unitized tapered roller bearing arrangement assembled with the process of the present invention, the punch used to deform the retaining element being illustrated in half section.

The assembly procedure of the present invention is ideally suited for installing a unitized tapered roller bearing B (FIG. 7) in a housing member 32 which corresponds to the outer part 2 in the previous general discussion. The housing member 32 in this instance is a wheel, but it may also be some other bearing housing which is either fixed or rotatable. In any event, the member 32 has a bore 34, a shoulder 36 at one end of the bore 34, and a groove 38 which opens into the bore 34.

The bearing B, which is contained within the bore 34, includes a cup 40 having a tapered inwardly presented raceway 42. The cup 40 fits into the bore 34 with the large diameter end of its raceway 42 presented toward the shoulder 36. The bore 34 also contains a separate cup thrust rib 44 which is located between the shoulder 36 and the front face of the cup 40, that is the face at the large diameter end of the raceway 42. The rib 44 has an axially directed portion 46 which projects into the cup 40 and forms an abutment or working surface at the large diameter end of the raceway 42. Interposed between the shoulder 36 and the thrust rib 44 is a flat washer 48 which serves as a grease retainer and dirt excluder.

The cup 40, rib 44 and flat washer 48 are all retained in the bore 34 by a clamping ring 50 having a lip 51 which is deformed into the groove 38. This ring 50 compensates for tolerance built up in the three elements, namely, the washer 48, the rib 44, and the cup 40, which are set end-to-end in the bore 34. The ring 50 is continuous across the bearing B to form a hub cap at the end of the bore 34.

The bearing B also includes a cone 52 having an outwardly presented raceway 54 which is located opposite the cup raceway 42. At the small diameter end of its raceway 54, the cone 52 is provided with an integral thrust rib 56 which projects toward the cup 40.

In addition to the foregoing components, the bearing B includes tapered rollers 59 arranged in a single row between and contacting the tapered raceways 42 and 54 of the cup 40 and cone 52, respectively. The large diameter ends of the rollers 58 are located adjacent to the working surface on the axially directed portion 46 of the cup thrust rib 44, while the small diameter ends are located adjacent to the cone thrust rib 56. Thus, the rollers 58 are confined in the radial direction by the tapered raceways 42 and 54 and in the axial direction by the thrust ribs 44 and 56. The proper spacing between adjacent rollers 58 is maintained by a cage 60.

The unitized bearing B like a conventional tapered roller bearing takes radial loading as well as thrust loading in the direction which causes the tapered rollers 58 to seat against the raceways 42 and 54, that is the direction which causes the thrust ribs 44 and 56 to move away from each other. In addition, the bearing B takes thrust loading in the opposite direction, that is the direction which causes the thrust ribs 44 and 56 to move toward each other. In that case, the thrust load is transmitted generally diagonally through the rollers 58 from one thrust rib to the other.

To assemble the bearing B in the housing 2, the flat washer 48 is first installed in the bore 34. Next, the unitized bearing B consisting of cone 52, rollers 58, cage 60, cup 40, and thrust rib 44 is installed in the bore 34. The unitized bearing is furnished from the manufacturer with the thrust rib 44 bonded to the front face of the cup 40 so that the bearing supplied as a package. Finally, the clamping ring 40 is inserted into the bore 34 and forced against the back face of the cup 40 by an inner punch 62. Then its lip 51 is deformed outwardly into the groove 38 by an outer punch 64, all in accordance with the procedures previously discussed. The clamping ring 50 compensates for relatively large overall tolerances resulting from the accumulation of tolerances in the cup 40, the cup thrust rib 44, and the washer 48.

Figure 8:
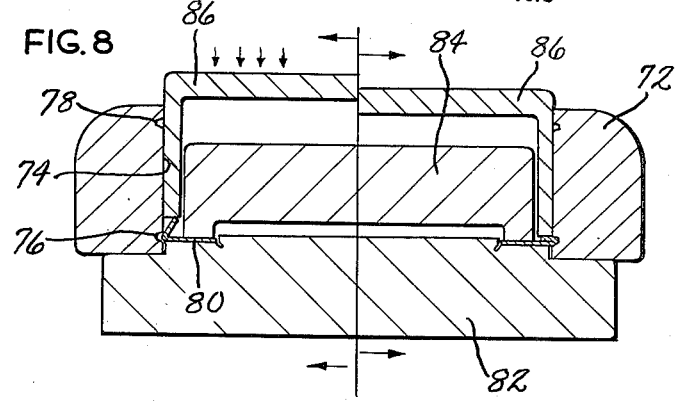
FIG. 8 shows the assembly procedure for a modified bearing arrangement, the first clamping ring being shown in the initial step of deformation on one half of the figure and in the final step of deformation in the other half of the figure.
Figure 9:
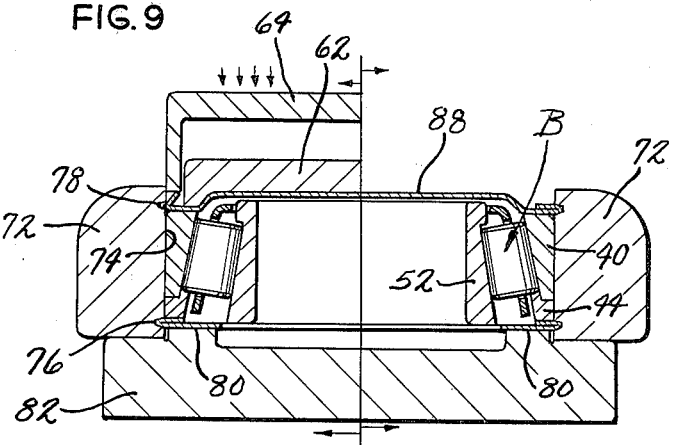
FIG. 9 is a sectional view of the bearing arrangement illustrated in FIG. 8 showing in half section the punches used to deform the second clamping ring.

A modified housing member 72 (FIGS. 8 and 9) has a bore 74 extended completely through it and inwardly opening grooves 76 and 78 at each end of the bore 74. The first groove 76 has a clamping ring 80 deformed into it in accordance with the procedure previously described. In this case, the back face of the ring 80 is supported on an anvil 82, while the inner and outer punches 84 and 86 operates against it (FIG. 8). The bearing B is installed in the bore 74 and finally another clamping ring 88 is deformed into the groove 78 in accordance with the procedure previously described (FIG. 9). Thus, the cup 40 and thrust rib 44 are captured between the clamping rings 80 and 88. In this connection, the washer 48 is eliminated since the clamping ring 80 serves its purpose as a grease retainer and dirt excluder.

This invention is intended to cover all changes and modifications of the example of the invention herein chosen for purposes of the disclosure which do not constitute departures from the spirit and scope of the invention.

What is claimed is:

1. A process for retaining a rigid inner part within a bore in a rigid outer part with no relative movement between the parts in the direction of the axis for the bore, the outer part having a backing surface for locating the inner part in a predetermined axial position within the bore and a groove opening into the bore at the end of the inner part when the inner part is located in the predetermined axial position by the backing surface, said process comprising: holding a retaining element against the end of the inner part when the inner part is in the predetermined position within the bore, the retaining element having a lip directed away from the end of the inner part generally in the axial direction and being inclined inwardly toward the axis of the bore; and while the retaining element is held against the inner part and the inner part is in said predetermined position, deforming the lip plastically into the groove by applying an axially directed force to the lip while preventing the lip from moving substantially inwardly toward the axis of the bore, whereby the retaining element becomes lodged in the groove and prevents withdrawal of the inner part from the bore.

2. The process according to claim 1 and further characterized by clamping the retaining element against the end of the inner part as the axially directed force is applied to the lip.

3. The process according to claim 1 wherein the end of the inner part is located between the sides of the grooves.

4. The process according to claim 3 wherein said one part is the inner part and said other part is the outer part.

5. The process according to claim 1 wherein the width of the groove is 0.005 to 0.015 inches greater than twice the thickness of the retaining element.

6. The process according to claim 1 wherein the inner part is the cup of a tapered roller bearing and the outer part is a housing for the cup.

7. A process for securing a rigid inner part within a bore in a rigid outer part so as to compensate for tolerances in the axial dimensions of the parts and with the securement being such that relative movement between the parts in the axial direction is precluded, said process comprising: advancing the inner part through the bore in the outer part until further advancement is prevented by a limiting surface; positioning a retaining element in the path of removal of one part from the other part, the retaining element having a blocking portion and a locking portion which is folded with respect to the blocking portion; applying a force to the blocking portion to hold it in a fixed blocking position wherein it prevents said one part from being removed from said other part and further prevents relative movemment between the parts; and while the force is applied to the blocking portion of the retaining element, applying another and separate force to the locking portion to plastically deform the locking portion both axially and radially such that it enters a groove located in said other part adjacent to the retaining element, whereby the blocking portion of the retaining element permanently remains in the blocking position wherein it prevents said one part from being removed from said other part and further prevents relative movement between the parts.

8. The process according to claim 7 wherein the locking portion of the retaining element includes a lip which is disposed at an oblique angle to the axis of the bore and terminates at a free end; and wherein the step of deforming the locking portion into the groove comprises applying an axially directed force to the lip and contemporaneously preventing the free end of the lip from moving away from the groove in the radial direction.

9. The process according to claim 8 wherein the groove has sidewalls and a back wall, and the locking portion after being deformed into the groove is spaced from the back wall.

10. The process according to claim 7 wherein the retaining element has substantially constant thickness, and the width of the groove is 0.005 to 0.015 inches greater than twice the thickness of the retaining element.

11. The process according to claim 7 wherein the blocking portion of the retaining element when in its blocking position is located substantially intermediate the sides of the groove.

12. A process for securing together inner and outer parts which are initially movable relative to each other in an axial direction, with the securement compensating for large tolerances in the axial dimensions of the parts and being such that relative movement between the parts in the axial direction is eliminated, said process comprising: advancing the inner part in the axial direction through the outer part to a predetermined position in which further advancement is prevented by a limiting surface, one of the parts having a groove which is exposed beyond the end of the other part when the inner part is in its predetermined position with respect to the outer part; positioning a deformable retaining element in the path of removal for said other part from said one part, the retaining element having a blocking portion which faces said other part and obstructs removal thereof from said one part and a folded back locking portion which extends generally in the axial direction; holding the retaining element in a fixed blocking position at the groove, the blocking portion preventing relative movement between the parts when in the fixed blocking position; and while the retaining element is held in the fixed blocking position applying a deforming force to the locking portion of the retaining element to cause the locking portion to undergo plastic flow in the axial direction and also in the lateral direction with the flow being such that the locking portion enters the groove in said one part without altering the axial position of the blocking portion, whereby the retaining element remains permanently secured in its blocking position to said one part to prevent said other part from being removed axially from said one part and to further prevent relative movement between the parts in the axial direction.

13. A process according to claim 12 wherein the locking portion of the retaining element includes a lip which is initially directed away from the other part and is deformed into the groove by applying the deforming force to the lip, said force being directed axially toward said other part.

14. A process according to claim 13 wherein the lip is restrained from moving radially away from the groove as the force is applied, whereby the lip deforms into the groove.

15. A process according to claim 13 wherein the lip prior to deformation is disposed at an oblique angle with respeect to the direction in which the force is applied and has a free end directed away from the groove.

16. A process according to claim 15 wherein the free end of the lip is restrained from moving away from the groove as the force is applied, whereby the lip deforms into the groove.

17. A process according to claim 16 and further characterized by forcing the retaining element tightly against the end of the other part as the deforming force is applied.

* * * * *